United States Patent [19]

Streicher

[11] Patent Number: 5,366,679
[45] Date of Patent: Nov. 22, 1994

[54] PROCESS FOR THERMAL DEBINDING AND SINTERING OF A WORKPIECE

[75] Inventor: Eric Streicher, Virofly, France

[73] Assignee: L'Air Liquide, Societe Anonyme pour l'Etude et l'Exploitation des Procedes Georges Claude, Paris Cedex, France

[21] Appl. No.: 888,645

[22] Filed: May 27, 1992

[51] Int. Cl.$^5$ .................... B29C 45/00; B22F 1/00
[52] U.S. Cl. ................... 264/125; 264/63; 264/328.1; 419/36; 419/37
[58] Field of Search ............ 264/63, 125, 328.1; 419/36, 37

[56] References Cited

U.S. PATENT DOCUMENTS

| | | |
|---|---|---|
| 4,404,166 | 9/1983 | Wiech, Jr. ............... 419/36 |
| 4,609,527 | 9/1986 | Rinderle et al. .......... 419/32 |
| 5,009,841 | 4/1991 | Bloemacher et al. ...... 419/23 |
| 5,021,208 | 6/1991 | Ludwig et al. ........... 264/344 |
| 5,028,367 | 7/1991 | Wei et al. ................ 264/63 |

*Primary Examiner*—Allan R. Kuhns
*Attorney, Agent, or Firm*—Oblon, Spivak, McClelland, Maier & Neustadt

[57] ABSTRACT

A process for thermal debinding and sintering of a workpiece made by molding a mixture of a binder and a powder, the process entailing the steps of injection molding a workpiece entailing at least 30% vol. of binder, the binder containing from about 70% to about 90% wt. of at least one wax and from about 10% to 30% wt. of high molecular weight polymer, introducing the molded workpiece in an enclosure at ambient temperature, injecting an atmosphere of at least 95% vol. hydrogen and less than 5% vol. water vapor, heating the enclosure and/or the workpiece until reaching a temperature between about 150° C. to about 200° C., maintaining the temperature during a period of time sufficient to substantially decompose all the waxes in the binder, then heating again the enclosure and/or the workpiece to reach a temperature of about 700° C. while substantially eliminating the rest of the binder, maintaining the temperature until the workpiece is substantially sintered, cooling the enclosure and the workpiece to reach a temperature where no substantial oxidation can occur, then withdrawing the workpiece from the enclosure.

13 Claims, No Drawings

PROCESS FOR THERMAL DEBINDING AND SINTERING OF A WORKPIECE

BACKGROUND OF THE INVENTION

1. Field of the Invention

The present invention relates to a process for thermal debinding and sintering of a workpiece.

2. Description of the Background

Injection molding is a widely used method for fabricating specimens of complex geometry with precise dimensions, high density and homogenous microstructure. This process entails injecting a powder-polymer mixture into a mold, and heating the mixture to a temperature where its viscosity is low enough to allow flow and then injecting the mixture into a cold area or cold containment means where it solidifies into desire shape. After molding, the binder is removed and the powder network which remains is sintered. In view of the high volemic fraction of the binder, 40 to 60 vol %, the removal of the binder from the parts, or debinding, is a critical step in the process.

At present, producers are limited to the use of small parts because debinding of thick sections requires a long time and often leads to defects such as distortion, cracking or blistering. Besides those problems, producers are also confronted with the control of the chemical composition of the products, mostly carbon and oxygen content, which are affected by the polymer decomposition.

Numerous debinding techniques have been developed, such as thermal debinding and solvent debinding. Thermal debinding effects binder removal by increasing the temperature. The polymer is decomposed into volatile species that diffuse through the compact to the surface, where it is removed. In this process, a high production rate of volatile species must be avoided to prevent defect formation within the green body. Thus, a slow removal rate is required, and consequently a long debinding cycle. This is the principal drawback of this debinding technique. Another example of thermal debinding is wicking debinding. In this process, the parts are in contact with a porous material (powder bed) which provides capillary flow for the binder which becomes liquid as the temperature increases. Compared with thermal debinding, wicking debinding saves time and allows better shape retention. The principal drawback of this method is the numerous manipulations of the parts, i.e. placing the parts into the powder bed, then removing and cleaning them.

Solvent debinding, involves immersion of the parts into a solvent which dissolves the polymer. The time of debinding may be reduced considerably, sometimes from days to a few hours, with better control of distortion than with thermal debinding. Nevertheless, because of the cost and toxicity of the solvents, this method is rarely used in industry.

Even though thermal debinding requires a long time and may be a source of numerous product defects, its simplicity and relative safety have favored its use in industry. Three theoretical steps may be used to describe the pyrolytical removal of binder from a green body by thermal degradation. Evaporation is only possible for species with low molecular weight, which undergo evaporation without chain scission. By low molecular weight is generally meant below about 1000 g/mol. The process of oxidation originates from an initial bond breaking reaction such as C—C bond scission. The following equations describe the oxidative degradation of a polymer.

Initiation
$$R\cdot + O_2 \rightarrow ROO\cdot$$

Propagation (auto-oxidation)
$$ROO\cdot + R'H \rightarrow ROOH + R'\cdot$$

Termination (inactive products)
$$ROO\cdot + R'\cdot \rightarrow ROOR'$$
$$2ROO\cdot \rightarrow R' = O + R''OH + O_2$$

Thermal degradation of a polymer occurs either by random scission through the polymer carbon backbone, or by monomer split-off.

The role of atmosphere during thermal debinding is fundamental. The use of gas compositions, such as nitrogen or argon, lead to a thermal degradation of the binder (random scission or/and monomer split-off). In this case, thermal degradation may occur in the core as well as in the surface of the part. Thus, the risk of defect formation is high because of the possibility of pressure build up within the compacts.

Oxidative atmospheres are also used in industry. With air or various mixture of oxygen and nitrogen, the binder oxidation is limited by oxygen diffusion through the porosity of the compacts. At the beginning, the reaction is limited to the surface; then the interface of decomposition moves toward the part center. Oxidative atmospheres offer the advantage of a progressive debinding with a limited risk of defect formation. Moreover, oxidative degradation is an auto-catalytic process which consequently leads to a rapid binder degradation. The principal drawback of using an oxidative debinding atmosphere is the risk of oxidation of the powder. For materials such as stainless steel, the sensitivity of chromium to oxidation forbids the use of oxidative atmosphere during debinding. The same conclusion can be drawn for ceramic materials, such as nitrides or carbides.

As an example of thermal debinding under neutral atmospheres, the experiments of Renowden and Pourtalet may be noted. See, Renowden, M. and Pourtalet, P., "Experimental Studies on Lubricant Removal", 1990 Advances in Powder Metallurgy, vol. 1, pp. 261-277.

In this study, the effect of veritable atmospheric composition on removal of zinc stearate lubricant was conducted. Generally, this article describes that the important steps in removing lubricants are 1) heating the mixture until the temperature of binder vaporization is reached, 2) transferring the vapor lubricant from the inside to the surface, 3) removing the vapor lubricant from the surface and 4) burning off the lubricants.

From this study, it was only concluded that a preferred atmosphere is 30% $H_2$, balance $N_2$ to remove wax binder, and that 50% $H_2$, balance $N_2$ is necessary at 550° C. to achieve 90% decomposition of the organic portion of zinc stearate lubricant. Further, it was found that at 550° C., and in a dry atmosphere, the removal of binder is complete, although higher temperature and more $H_2$ is necessary to remove zinc stearate lubricant. This process entails a slow decomposition of binder and poses a high risk of defect formation, particularly warping distortion.

Thus, in essence, thermal debinding under neutral atmospheres is limited by a slow binder decomposition process and a high risk of forming defects, while, thermal debinding under oxidative atmospheres is restricted to powders which are not sensitive to oxidation.

Thus, a need exists for a process of effecting thermal debinding of a workpiece under a neutral or oxidative atmosphere which is neither limited by a slow binder decomposition process nor a high risk of forming defects, particularly warping distortion.

SUMMARY OF THE INVENTION

Accordingly, it is an object of the present invention to provide a process for effecting thermal debinding of a workpiece which is not limited by a slow binder decomposition.

It is further an object of the present invention to provide a process for effecting thermal debinding of a workpiece which is not limited by a high risk of defect formation.

It is further an object of the present invention to provide a process for thermal debinding of a workpiece comprising a high content of binder, e.g. more than 30% volume.

The above objects and others which will become more apparent in view of the following are provided by a process for thermal debinding and sintering of a workpiece made by molding a mixture of a binder and a powder, the process entailing injection molding a workpiece containing at least 30% vol. of binder, the binder containing from about 70% to about 90% wt. of at least one wax and from about 10% to 30% wt. of at least one high molecular weight polymer, introducing the molded workpiece in an enclosure at ambient temperature, injecting an atmosphere of at least 95% vol. hydrogen and less than 5% vol. water vapor into the enclosure, heating the enclosure or workpiece or both until reaching a temperature between about 150° C. to about 200° C., maintaining this temperature for a period of time sufficient to substantially decompose all the waxes in the binder, then heating again the enclosure or workpiece or both to reach a temperature of at least about 500° C., preferably about 700° C., while substantially eliminating the rest of the binder, maintaining the temperature until the workpiece is substantially sintered, cooling the enclosure and the workpiece to reach a temperature where no substantial oxidation can occur, then withdrawing the workpiece from the enclosure.

According to the invention it has been discovered that to avoid warping distortion, the shrinkage of the parts must be isotropic, which means that debinding must be homogeneous.

It has been further found that even if debinding in pure nitrogen allows low distortion whatever the heating rate, debinding in $H_2$ and $N_2$ mixtures requires careful control of heating rate and hydrogen concentrations to avoid or at least limit substantially said distortion. Generally speaking, low distortions are obtained with a low heating rate and a high amount hydrogen (substantially greater than 50%). The process disclosed hereinabove allows to substantially prevent any warping distortion.

DETAILED DESCRIPTION OF THE PREFERRED EMBODIMENTS

In accordance with the present invention, a process is provided for thermal debinding and sintering of a workpiece made by molding a mixture of a binder and a powder.

The binder used in injection molding is a mixture of low molecular weight binders, generally of a molecular weight of less than 1,000 g/mol such as waxes, and high molecular weight polymers, generally of a molecular weight of greater than 45,000 g/mol, such as polypropylene or polyethylene. The present invention contemplates a two stage thermal debinding. A first stage is effected at low temperature, generally less than about 200° C. to remove the low molecular weight binder, followed by a second stage at a temperature between about 200° and 500° C. to remove the remaining fractions of the binder, i.e., the ones having a high molecular weight.

During the first stage of the debinding, about 30% of the binder is removed. Atmospheres with a high hydrogen concentration must be used; such as gas composition having hydrogen content in excess of 15 vol %. In the presence of a hydrogen based gas composition, binder degradation is activated by a hydrogenation process. The C—C bonds of binder are broken to generate carbon groups saturated with hydrogen accordingly to the following reaction:

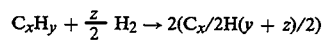

The hydrogenation process is dependent on a continuous supply of hydrogen at the gas-polymer interface. At the beginning of the decomposition, the reaction is limited to the surface of the parts, then the decomposition interface proceeds toward the core. In this case, likewise an oxidative process, the debinding mechanisms limit the risk of defect formation. Moreover, hydrogen offers the possibility of debinding materials which cannot be treated under oxidative atmospheres because of oxidation problems.

During the second stage of the debinding, at a temperature of between about 200° and 500° C., preferably 700° C., the choice of atmosphere is dependent on the material treated and may be pure hydrogen in the case of stainless steel or mixtures of nitrogen and hydrogen in the case of iron-nickel mixtures. The thermal treatment can be rapid, i.e. a heating rate around 4° C./min, because the porosity created during the previous stage allows gas migration to the surface of the parts.

Generally, in accordance with the present invention, a workpiece is first injection molded, which workpiece contains at least about 30 vol. % binder, which binder contains from about 70% to about 90% by wt. of at least one wax, and from about 10% to about 30% by wt. of one or more high molecular weight polymers. Then, the molded workpiece is introduced into an enclosure at ambient temperature.

Thereafter, an atmosphere of at least 95 vol. % of hydrogen and less than 5 vol. % of water vapor is injected into the enclosure, and the enclosure is then heated or the workpiece is heated or both are heated until the workpiece reaches a temperature of about 150° C. to about 200° C. This temperature is maintained for a period of time sufficient to substantially decompose all the waxes in the binder.

Then, the enclosure or workpiece or both are heated again such that the workpiece reaches a temperature of about 700° C., in order to substantially eliminate the remaining binder. This temperature is maintained until the workpiece is free from binder. Then, the enclosure and workpiece are cooled to reach a temperature where no substantial oxidation can occur.

Generally, in accordance with the present invention, the heating in step d) from ambient temperature to about 150° C.–200° C. is conducted at a rate of about 4° C./min. Then, this temperature is maintained at between about 150°–200° C., until the waxes are eliminated.

In step e), the heating is generally conducted at from about 200°–700° C. at a rate of about 2° to 5° C./min. Thereafter, the temperature is maintained at about 700° C.

Having generally described the present invention, reference will now be made to certain examples which are provided solely for purposes of illustration and which are not intended to be limitative.

EXAMPLE

Fe-2% Ni cylindrical parts of 10 mm diameter and 20 mm height have been molded. The binder was a thermoplastic based on paraffin wax (69 wt %), carnauba wax (10 wt%), polypropylene (20 wt%) and stearic acid (1 wt%). The volume fraction of the powder in the powder-binder mixture was 62.4 vol%.

The thermal treatment entailed a heating rate of about 1° C./min up to about 150° C. with a holding time of 10 hours, followed by a heating rate of about 4° C./min up to about 180° C. with a holding time of 8 hours. The entire cycle lasted about 20 hours. The following gas compositions have been tested.

Oxidizing
Air

Neutral
$N_2$
Argon (Ar)

Reducing
$H_2$
$N_2$—$H_2$ (15-50-75%)
$H_2$—$H_2O$(DP = 20° C., %$H_2O$ = 3.3%)

To evaluate a possible oxidation of the powder during the first stage of the debinding, loose powder without binder was treated with the injected parts. The weight loss of the samples were measured.

The highest rates of decomposition were obtained using air, pure hydrogen or a mixture of hydrogen and water vapor. A debinding using air led to an oxidation of the powder which was avoided when using pure hydrogen. The extent of the oxidation was much lower under hydrogen and water vapor mixture then under air: 0.03% and 0.34%, respectively. The sample debound under pure nitrogen is fractured while the others are defect free.

After the first stage of the debinding, the parts were heated up to 500° C. without further defects formation. The heating cycle entailed of a heating rate of 2° C./min, and the gas composition was a mixture of nitrogen and hydrogen.

Using the same powder-binder composition described above, turbines were molded.

The part was put in a batch furnace for debinding. The furnace temperature was increased slowly (1° C./min) to reach 150° C. and was held at this temperature for 10 hours. During this treatment, the average binder decomposition rate was 0.53 and 0.25 mg/h/cm$^2$ under pure hydrogen and nitrogen, respectively. In other words, the time of the first stage of debinding can be halved, if neutral atmospheres are changed to reducing atmospheres. After the first stage of debinding, the furnace temperature was increased up to 700° C. to remove the remaining fraction of binder. The gas composition was a mixture of 85 vol% nitrogen and 15 vol% hydrogen. No apparent defects appeared for the parts treated under pure hydrogen during the first stage, but those treated under pure nitrogen were cracked. The sintering at 1200° C. for two hours was conducted under a mixture of nitrogen and hydrogen (85/15 in vol%) in a batch furnace separated from the debinding one.

Having described the present invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for thermal debinding and sintering of a workpiece made by molding a mixture of a binder containing wax and a powder, the process comprising:
   a) injection molding of a workpiece comprising at least 30% by volume of a binder, said binder comprising from about 70% to about 90% by weight of at least one low molecular weight binder and from about 10% to 30% by weight of a high molecular weight polymer,
   b) introducing said molded workpiece in an enclosure at ambient temperature,
   c) injecting a reducing atmosphere into said enclosure, said reducing atmosphere comprising at least 95% by volume of hydrogen,
   d) heating said enclosure or said workpiece or both to a temperature for a period of time sufficient to substantially decompose all of the wax in the binder, said heating taking place under a reducing atmosphere comprising at least 95% by volume of hydrogen, and said heating occurring at a heating rate of between about 1° C./min and about 2° C./min,
   e) heating again said enclosure or said workpiece or both, under a reducing atmosphere which is the same or different from that of steps c) and d), to a temperature and for a period of time sufficient to substantially eliminate the remainder of the binder, said heating to maximum temperature occurring at a heating rate of between about 2° C./min and about 5° C./min,
   f) maintaining said temperature until said workpiece is substantially sintered,
   g) cooling the enclosure under a reducing atmosphere which is the same or different from that of steps c) and d), and the workpiece to reach a temperature where no substantial oxidation can occur, and then
   h) withdrawing the workpiece from the enclosure.

2. The process of claim 1, wherein in step d), said temperature is up to about 200° C.

3. The process of claim 1, wherein in step e), said temperature is from about 200° C. to about 700° C.

4. The process of claim 1, wherein said low molecular weight binder has a molecular weight of less than about 1,000 g/mol.

5. The process of claim 4, wherein said low molecular weight binder is a wax.

6. The process of claim 1, wherein said high molecular weight polymer has a molecular weight of at least 45,000 g/mol.

7. The process of claim 6, wherein said polymer is polyethylene or polypropylene.

8. The process of claim 2, wherein said temperature is from about 150° C. to about 200° C.

9. The process of claim 3, wherein said temperature is from about 200° C. to about 500° C.

10. The process of claim 5, wherein said wax is selected from the group consisting of paraffin wax and carnauba wax.

11. The process of claim 1, wherein said reducing atmosphere of step e) is selected from the group consisting of pure hydrogen, hydrogen and nitrogen, and hydrogen and water vapor.

12. The process of claim 1, wherein the reducing atmosphere of step c) is pure hydrogen.

13. The process of claim 1, wherein in step e), said maximum temperature is maintained for about 8 hours.

* * * * *